United States Patent Office

3,316,115
Patented Apr. 25, 1967

3,316,115
MARKING COMPOSITION
Marion D. Barnes, Washington, D.C., and John M. Dale, San Antonio, Tex., assignors, by mesne assignments, to Research Corporation, New York, N.Y., a non-profit corporation of New York
No Drawing. Filed Jan. 2, 1963, Ser. No. 248,885
14 Claims. (Cl. 106—287)

The present invention relates to new and useful compositions for marking roads and the like.

Quite a wide variety of paints and other coating materials have been proposed for use in marking roads, parking lots and similar surfaces. The demands on such compositions necessarily vary depending upon the intended use and the severity of weather and traffic conditions encountered in such use. Most known compositions are limited as to their areas of use and they are not usually satisfactory for general application due to cost and/or durability, especially in the case where severe weather and traffic conditions are encountered. The low durability or wear resistance of these compositions may be caused by any one of a number of factors such as lack of adhesion to the asphalt or other surface or low impact resistance, tensile strength or compressive strength, necessitating frequent repair or renewal of the resulting marks. Components may be added to improve one or more of these characteristics, e.g. adhesion, but such components frequently effect other important characteristics in an undesirable fashion and, in any case, increase the cost of the resulting compositions to the point where they may not be useful from an economic standpoint.

As will be appreciated from the foregoing, there is a real need for an economical and otherwise practical marking composition which has optimum application and wear characteristics. The principal object of the present invention is to provide such a composition and a method of making and using the same.

Another object of the invention is to provide a composition of the type indicated which has exceptional durability under the most severe conditions of use. Still another object of the invention is the provision of a composition which can be readily and economically modified to satisfy a wide variety of marking uses. A more specific object is to provide a highly durable and otherwise satisfactory marking composition which has optimum characteristics in such critical areas as adhesion towards asphalt or other road surfaces, hardness, impact strength and tensile and compressive strength. A further object is the provision of a marking composition which, in addition to its unique wear resistance, also has the advantage of remaining clean under weather and traffic conditions which cause conventional compositions to become dirty as a result of asphalt pickup or the like.

In addition to the above objects and advantages, the composition of the present invention is characterized by a rapid and controlled drying time, even in cold weather. Most prior marking formulations dry much too slowly, particularly in cold weather and necessitate the use of marking cones which constitute driving hazards. In contrast, the present formulation dries quickly so that marking cones are not needed.

Another problem of prior formulations is that they cannot be left to stand in the application equipment overnight or for long periods of inactivity due to clogging and cleaning problems. These problems are also obviated by the present compositions which may be conveniently left in the equipment for as long as desired without complication.

Other objects will also be hereinafter apparent from the following detailed description of the invention.

According to the present invention, the foregoing objects are realized by the provision of a composition which comprises a major amount of sulphur plasticized with at least one polysulphide polymer as described in more detail below. It is notable that the composition is rosin-free or at least essentially so. Previous attempts to use sulphur for highway marking purposes have required the use of rosin as an essential binder but this component is difficult to compound with sulphur and is otherwise undesirable to work with. It is a surprising aspect of the present invention that a highly effective highway marking composition demonstrating superior wear characteristics can be provided without rosin when the conditions outlined hereinafter are followed.

The polysulphide plasticizer used herein may be (1) an aryl polysulphide wherein the bridging links between adjacent sulphur atoms in the polymer chain include an aromatic radical; and/or (2) an aliphatic polysulphide wherein the bridging links between adjacent sulphur atoms in the polymer chain include aliphatic ether linkages, e.g. $-CH_2OCH_2OCH_2-$ and the like.

These plasticizers should be thermally stable at the elevated temperatures, e.g. 160° C. and above, used to prepare and apply the present formulations. Additionally, these plasticizers should have a vapor pressure substantially below that of polyethylene tetrasulphide, e.g. at least 10% lower. Typical of the first group of plasticizers suitable for use herein is styrene polysulphide. This polymer may be identified by the repeating unit $-C_2H_3C_6H_5S_{16}-$ and is available as Thiokol polymer ZM-399. Another polysulphide plasticizer in this group is one having the repeating unit $-CH_2-C_6H_4-CH_2-S_x$ where $x$ is an integer, e.g. 2. As will be appreciated, these aryl polysulphide plasticizers are characterized by the recurring unit $-RS_x$ where $x$ is an integer, typically in the range of 2 to 16 and R is arylene, preferably vinylarylene or alkarylene since the presence of vinyl or alkylene groups in combination with the aryl radical gives exceptionally good results.

The aliphatic polysulphides containing ether linkages may be exemplified by Thiokol LP3. Structurally, this polymer has the recurring unit

$$-S_xCH_2CH_2OCH_2OCH_2CH_2S_x-$$

where $x$ has a value of 4. This polymer is further characterized by a viscosity at 77° F. of approximately 10 poises and a molecular weight of about 1000. Other aliphatic polysulphides which include similar or equivalent ether linkages may also be utilized provided, of course, they are stable at the formulating and applicating temperatures and function to plasticize the sulphur.

The plasticizers used herein are essentially odorless. This represents a substantial advantage over other polysulphides, e.g. polyethylene tetrasulphide, which have objectionable odors and are otherwise difficult to work with. It has also been found that the plasticizers of the invention, in contrast to polyethylene tetrasulphide, do not darken the composition on heating and they effectively eliminate or minimize the tendency of the sulphur to increase in viscosity at elevated temperatures above the melting point thereof thus greatly improving the application characteristics of the present formulation. In addition, the plasticizer appears to give a better suspension of glass beads in the molten formulation than is otherwise possible.

As indicated, one or more of the above plasticizers may be used in the practice of the present invention. The total plasticizer content will normally fall within the range of 1-30 parts, by weight, per 100 parts of the total formulation, although about 10 parts is usually preferred. Particularly effective results are obtained using a plasticizer mixture comprising equal parts by weight of the two polysulphide polymers LP-3 and ZM-399 and a preferred formulation includes 5 parts LP-3 and 5 parts ZM-399, by weight, although other proportions may also be employed depending on the ultimate uses which are visualized. For example, using a plasticizer mixture containing equal parts of the indicated plasticizers LP-3 and ZM-399, satisfactory results have been obtained using as little as 2 parts of the plasticizer mixture or as much as 20–30 parts. Additionally, while the use of a plasticizer mixture containing equal parts by weight of the two plasticizers is preferred, it is possible to use unequal ratios of LP-3 and ZM-399, e.g. a 40/60 mixture.

Commercially available "bright" sulphur may be used herein. This form of sulphur is substantially free of undesirably dark coloration. Generally speaking, from 30 to 95 parts of sulphur, with 70 to 90 parts preferred, will be included per 100 parts, by weight, of the final (bead-free) composition.

According to another aspect of the invention, it has been found advantageous to include a small amount of an alkaline material in the composition. A variety of organic and inorganic bases may be used for this purpose provided the base selected does not discolor and is stable at the temperatures used for preparing the present compositions and applying the same. Typically suitable bases include amines and alkali metal and alkaline earth metal carbonates with calcium carbonate the preferred material. It has been surprisingly found that the calcium carbonate or other alkaline material contributes very substantially to the serviceability of the marking composition described herein. In particular, the alkaline material appears to serve as a catalyst which accelerates introduction of the plasticizer into the molten sulphur. For example, it has been found that the presence of the alkaline material decreases from ten to twenty fold the time necessary for a plasticized formulation to come to equilibrium. Another advantage of using calcium carbonate is that it apparently combines in some way with the sulphur to improve the mechanical properties of the sulphur and the composition as a whole. The carbonate or other basic material also functions to neutralize acidity contained in the plasticizer and any acid formed during the life of the marking. In addition, the basic material facilitates nucleation or setting by providing nucleating centers which expedite solidification as the sulphur cools off. The amount of carbonate or other alkali utilized may be varied although, generally speaking, from 0.5 to 2 parts by weight thereof should be used, per 100 parts of formulation, with 0.5 part the preferred amount.

In the case where the composition is to be used under severe weather and/or traffic conditions, the present invention also contemplates the addition of glass fibers to the plasticized sulphur formulations described herein. The glass fibers serve to reinforce the sulphur and are particularly effective for increasing impact resistance. For this aspect of the invention, it is desirable to use chopped strand fibers whose length does not substantially exceed 0.5 inch. Strands chopped to this maximum length are easy to handle and can be readily and uniformly dispersed in molten sulphur when preparing or using the formulations. Longer fiber lengths, e.g. greater than 0.5 inch, tend to ball up when dispersed and are otherwise difficult to handle.

Fiber lengths down to 0.25 inch or even shorter may be satisfactorily used although it is desirable from an economic standpoint to use the maximum length, consistent with the above limitation, in order to minimize chopping and other processing costs. The percentage of glass fibers utilized herein may be widely varied (for example, from 1 to 50 parts, per 100 parts of formulation, by weight, with 1 to 3 parts preferred).

The composition of the invention may also include an appropriate pigment to give a desired color effect. The unpigmented compositions have a naturally yellowish sulphur color but a brighter or more brilliant yellow may be obtained by adding one or more appropriate yellow pigments in amounts varying from about 1 to up to about 2.5 parts per 100 parts by weight of the formulation. Where a white color is desired, substantially more white pigment is necessary to mask the yellow color of the sulphur. Generally speaking, the white pigment or pigments should be used in amounts varying from 5% to as high as about 35–40% by weight although in the usual case, a pigment content of the order of 20–25% is sufficient, depending on the type of the pigment, the degree of color desired and other factors. Typically suitable white pigments are titanium dioxide or mixtures thereof with calcium sulphate (e.g. 30% dioxide and 70% sulphate).

It may also be convenient for certain uses, e.g. the center lining of roads, to include glass beads in the composition for light-reflective purposes. The use of glass beads in highway marking paints has previously been proposed but the present invention visualizes the use of substantially larger beads than hitherto utilized. Thus, in previous formulations, it has been proposed to use beads having an average diameter of from about 3 to about 10 mils corresponding to 200 to 60 mesh sieve openings. On the other hand, the beads visualized for use herein are desirably such that they fall within the range of 60 to 18–20 mesh sieves, i.e. the bead diameters are such that at least substantially all of the beads pass 18–20 mesh screens but are retained on a 60 mesh screen (U.S. standard sieve). Additionally, the beads used herein should be: highly resistant to traffic wear and weathering; transparent; spherical in shape, containing not more than 30% of irregularly shaped particles; and essentially free from sharp angular particles, and particles showing milkiness of surface scoring or scratching. Moreover, the beads should preferably meet the gradation requirements shown in the table below:

GLASS BEAD SPECIFICATIONS

| Opening (U.S. Standard sieve) | Percent passing |
|---|---|
| No. 18 | 100 |
| No. 20 | 90–100 |
| No. 30 | 75–90 |
| No. 50 | 9–20 |
| No. 60 | 0–1 |

The beads when tested by the well known liquid immersion method at 25° C., should normally have an index of refraction within the range of 1.50 to 1.65 although a higher index value can be obtained by mixing the beads having an index of refraction within the range of 1.92 to 1.94. When tested in compression at a loading rate of 70 pounds per minute, the average resistance to failure preferably should be as follows:

GLASS BEAD LOADING

| Mesh size | Pounds |
|---|---|
| 20–30 | 35 |
| 30–40 | 25 |

In addition to the above characteristics, the beads employed herein should show no tendency toward decomposition, including surface etching, when exposed to atmospheric conditions, moisture, dilute acid or alkalies or paint film constituents. The beads should also be free of silicones, waxes, and, in certain situations, lead.

The beads will normally be used in amounts varying from 50 to 75 parts by weight per 100 parts of the bead-free formulation. It should be noted for clarity that all other proportions given herein, e.g. the amounts of plasticizer, are based on the weight of the bead-free formulation. Advantageously, 10–25% of the glass bead content should comprise high index beads (index of refraction between 1.92 and 1.94) having a mesh size in the range of 18 to 30.

The use of beads as described above also results in a composition which has improved wear characteristics. The beads may be incorporated by premixing, i.e. adding them to the molten plasticized formulation, or by dropping them on the formulation after it has been applied. Regardless of the method of incorporating the beads, it has been surprisingly found that the plasticized formulation of the invention shows unusually high adherence to the beads with the result that the beads stay in the applied position much better than with prior marking paints. The excellent control in the drying time for the present compositions is also advantageous for the bead aspect of the invention since the applied composition while characterized by its rapid setting, can be easily controlled to remain fluid for from thirty seconds to five minutes as may be desired to receive the glass beads.

According to a further feature of the invention, it has been found that the use of a composition which is harder than the asphalt or other paved surface under the conditions of use will give road markings which remain remarkably clean even in hot climates where road markings would normally become extremely dirty due to asphalt pickup. Thus, for example, it has been found that compositions which have a plastometer number of about 25 or less, on the Plastometer Scale, will stay clean and attractive on asphalt despite year-round hot weather. The plastometer numbers can be determined for the composition and paved surface by using the Plastometer Scale which is a standard means of determining hardness and is designed to convert into one scale, hardness readings which have been taken on different instruments and would otherwise be difficult to compare. The Plastometer Scale begins at zero for non-plastic materials such as glass and increases in number with increased softness. For example, the plastometer numbers for transite and rock salt are 4 and 7, respectively, while sulphur per se shows a value of 15 and the ordinary type of asphalt road is about 35. The 5–5 sulphur formulation described herein (i.e. the composition containing 5 parts of ZM–399 and 5 parts LP– 3, .5 part calcium carbonate and .5 part dye per 100 parts of bead-free formulation) shows a value of 22 on the Plastometer Scale and is, therefore, particularly suitable for use on asphalt in areas where a hot climate prevails year-round.

The compositions of the invention may be compounded in essentially dry form by blending or mixing the various components together at atmospheric temperature and then melting. Thereafter, glass fibers and beads may be added, if used. As an alternative, all of the other components may be added more or less together to the molten sulphur. A unique aspect of the invention is that the present compositions are desirably prepared and applied at a temperature well above 160° C., preferably in the area of 170° C. This is significantly different from prior proposals which have considered it essential to operate at temperatures below 160° C. Surprisingly, however, it has been found that best results, on the basis of mechanical properties, penetration and adhesion to the road surface, adhesion to beads and hardness are obtained using the indicated temperature of about 170° C. although it will be appreciated that the compositions may be formulated and applied at lower temperatures, e.g. 140° C. and even lower almost to the melting point of sulphur (119° C.).

The present compositions may be applied to the road surface in any convenient fashion but spraying in the molten state is generally the most convenient and preferred method of application. Conventional spraying apparatus including appropriate compressing means may be used although a particularly advantageous arrangement for present purposes comprises the combination of a material container and an internal combustion engine and eliminates the need for a compressor. This is possible because the spray system does not need atomizing air and only needs pressure on the material tank. The needed pressure may be obtained by injecting water into a chamber in the molten sulphur tank. The saturated vapor pressure of water in equilibrium with the molten sulphur in the tank at 170° C. is about 118 pounds per square inch absolute which is somewhat greater than the pressure obtained with the conventional compressors and with spraying apparatus. The exhaust from the internal combustion engine may be used to melt the sulphur.

The invention is illustrated, but not limited, by the following examples wherein parts and percentages are on a weight basis:

*Example 1*

88 parts of commercial flake sulphur, 5 parts LP–3, 5 parts ZM–399, 0.5 part $CaCO_3$ and 5 parts yellow pigment are heated together at a temperature of 170° C. with stirring until the sulphur is melted and the other materials uniformly dispersed therein. The resulting composition at 170° C. was then sprayed onto asphalt to give a highly satisfactory, durable and effective marking line. The line demonstrated the following desirable properties: shore hardness (B–2) 88, impact resistance 2.6 pounds, compressive strength 680 pounds per square inch and tensile strength 69 pounds per square inch.

*Example 2*

Example 1 was repeated except that after preparing the formulation of sulphur, plasticizers, $CaCO_3$ and pigment, 50 parts of glass beads were added. The resulting line showed the same shore hardness number of 88, but an increased impact resistance of 3.3 pounds, compressive strength of 764 pounds per square inch and a tensile strength of 78 pounds per square inch.

*Example 3*

Example 1 was repeated except that 1 part glass fibers (average length 0.25 inch) was added and the sulphur content was reduced to 87 parts. Highway marking prepared therefrom demonstrated the same shore hardness of 88 but a remarkably greater impact resistance of 28.6 pounds, compressive strength of 845 pounds per square inch and a tensile strength of 163 pounds per square inch.

The same formulation was prepared as described in the preceding paragraph with the subsequent addition of 50 parts glass beads as in Example 2 to give a light reflective composition which, when used for road marking purposes, demonstrates a shore hardness of 88, impact resistance of 19.3 pounds, compressive strength of 700 pounds per square inch and tensile strength of 103 pounds per square inch.

*Example 4*

Two formulations were prepared as in Example 1 except that, in lieu of 88 parts sulphur, 86 parts were used and 2 parts of glass fibers (0.50 inch length) were included. To one of these formulations, 50 parts of glass beads were added and the two formulations were tested as before with the following results.

| | Hardness Shore B-2 | Impact Resistance (pounds) | Compressive Strength (pounds/in.$^2$) | Tensile Strength (pounds/in.$^2$) |
|---|---|---|---|---|
| Without Beads | 88 | 57.9 | 690 | 188 |
| With Beads | 88 | 41.7 | 684 | 94 |

Both of these formulations are suitable for general use, as, for example, highway marking, parking lots and the like.

Two further formulations were prepared as in Example 1 except that in this case, only 85 parts sulphur were used and 3 parts of ½ inch glass fibers were added. To one of these formulations, 50 parts of glass beads were also added and the two compositions were evaluated. The following results were obtained:

|  | Hardness Shore B-2 | Impact Resistance (pounds) | Compressive Strength (pounds/in.²) | Tensile Strength (pounds/in.²) |
|---|---|---|---|---|
| Without Beads | 88 | 70.5 | 867 | 279 |
| With Beads | 88 | 47.4 | 577 | 192 |

*Example 5*

Example 1 was repeated except that the formulation was modified to include only 83 parts sulphur and the amount of each plasticizer was increased to 7.5 parts. Markings from this composition demonstrated shore hardness of 80, impact resistance of 6.5 pounds, a compressive strength of 350 pounds per square inch and a tensile strength of 42 pounds per square inch. With the addition of 2 parts of ½ inch glass fibers, the resulting formulation is especially desirable for use under severe traffic conditions in warm to hot climates.

*Example 6*

Two formulations were prepared as in Example 1 except that the amount of each plasticizer was increased to 10 parts and the sulphur content was reduced to 78 parts. To one of these formulations, 50 parts of glass beads were subsequently added. The two formulations when tested as before showed the following properties:

|  | Hardness Shore B-2 | Impact Resistance (pounds) | Compressive Strength (pounds/in.²) | Tensile Strength (pounds/in.²) |
|---|---|---|---|---|
| Without Beads | 72 | 9.4 | 284 | 27 |
| With Beads | 72 | 8.6 | 415 | 33 |

These compositions, particularly with the addition of two parts ½ inch glass fibers, are especially useful for markings subject to severe service in cool climates.

*Example 7*

Two further formulations were prepared following the procedure of Example 1 except that the yellow pigment was replaced by 25 parts of a white pigment comprising a 30/70 mixture of titanium dioxide and calcium sulphate, and the amount of sulphur was reduced to 64.5 parts. To one of these formulations 50 parts of the glass beads were added. Testing of these formulations showed the following properties:

|  | Hardness Shore B-2 | Impact Resistance (pounds) | Compressive Strength (pounds/in.²) | Tensile Strength (pounds/in.²) |
|---|---|---|---|---|
| Without Beads | 93 | 6.6 | 1,800 | 112 |
| With Beads | 93 | 7.6 | 1,190 | 148 |

*Example 8*

Two formulations were prepared of the following compositions using the procedure of Example 1:

FORMULA A

| | Parts |
|---|---|
| LP-3 | 10 |
| ZM-399 | 10 |
| CaCO₃ (fine) | 24 |
| TiO₂ | 6 |
| Sand | 10 |
| Glass beads | 10 |
| Sulphur | 30 |

FORMULA B

| | |
|---|---|
| LP-3 | 10 |
| ZM-399 | 10 |
| CaCO₃ (coarse) | 24 |
| TiO₂ | 6 |
| Federal Yellow pigment | 2.5 |
| Glass beads | 10 |
| Sulphur | 37.5 |

These formulations also gave good results as evidenced by the fact that markings prepared therefrom on extremely busy asphalt highways remained essentially unchanged for more than fourteen months whereas normal road paints last about three months under identical conditions of use. Other properties for markings obtained with the formulations of this example include the following:

|  | Hardness Shore B-2 | Impact Resistance (pounds) | Compressive Strength (pounds/in.²) | Tensile Strength (pounds/in.²) |
|---|---|---|---|---|
| Formula A | 72 | 11.0 | 522 | 95 |
| Formula B | 70 | 8.4 | 284 | 33 |

All of the formulations described above can be effectively used for highway marking and like purposes although, as indicated, some of these compositions are particularly suitable for use under special service conditions. For instance, the formulation of Example 5, when it includes glass fibers, is particularly useful under severe service conditions, e.g. pedestrian cross-walks or highway center lines, in farm or hot climates. One of the advantages of the present invention is that the compositions can be easily tailored to fit any type of road marking use. In this connection, it will be recognized that the exact nature of any composition will depend upon the particular use which is visualized and the severity of the service conditions which will be encountered. Thus, for marking parking lots, where there is a minimum wear requirement, it is possible to use formulations which contain maximum amounts of sulphur along with plasticizer and pigment but no glass fibers or beads. For average highway conditions where no substantial impact is involved such as highway edge lines, glass fibers need not be used but it may be advantageous to use larger amounts of plasticizer along with pigment and glass beads. For rigid use, the formulation should be designed for maximum impact and wear and in this case, glass fibers should be included with or without glass beads depending on the desirability of providing light reflection.

Various further modifications may be made in the invention as described above. For example, additional aggregate in the form of sand or similar material may be included in the formulation as shown in Example 8 in amounts varying from 10 to 40% by weight. Polyester fibers may also be included in lieu of, or in addition to, the glass fibers. It may also be advantageous in some instances to prime the surface which is being coated, e.g. concrete, with a conventional type of primer, to further improve the bond between this surface and the present compositions.

Having described the invention above, the scope thereof is defined in the following claims:

We claim:
1. A composition for use in marking roads and the like, said composition consisting essentially of a major amount of sulphur and a plasticizing amount of at least one polysulphide polymer plasticizer therefor selected from the group consisting of arylene polysulphides and aliphatic polysulphides containing aliphatic ether chains joining the sulphur atoms therein.
2. The composition of claim 1 wherein said polysulphide has a vapor pressure substantially lower than that of polyethylene tetrasulphide.
3. The composition of claim 1 wherein said polysulphide is styrene polysulphide.
4. The composition of claim 1 wherein said aliphatic polysulphide has the recurring unit

$-S_4CH_2CH_2OCH_2OCH_2CH_2S_4-$

5. The composition of claim 1 including a mixture of said arylene and aliphatic polysulphides.
6. The composition of claim 5 including equal proportions of said polysulphides.
7. A composition for use in marking roads and the like consisting essentially of 30–90 parts by weight of sulphur as the major component, from 1–30 parts by weight of at least one polysulphide polymer plasticizer selected from the group consisting of arylene polysulphides and aliphatic polysulphides containing aliphatic ether chains joining the sulphur atoms therein and from 0.5 to 2 parts by weight of an alkaline substance selected from the group consisting of alkali metal and alkaline earth metal carbonates.
8. A composition for use in marking roads and the like consisting essentially of, by weight, 30–90 parts sulphur as the major component, from 1–30 parts of at least one polysulphide polymer plasticizer selected from the group consisting of arylene polysulphides and aliphatic polysulphides containing aliphatic ether chains joining the sulphur atoms therein, from 0.5 to 2 parts of an alkaline plasticizer accelerator selected from the group consisting of alkali metal and alkaline earth metal carbonates and from 1–3 parts glass fibers.
9. A composition according to claim 7 wherein said alkaline substance is calcium carbonate.
10. A composition for use in marking roads and the like consisting essentially of, by weight, 30 to 95 parts sulphur, and from 1 to 30 parts of at least one polysulphide polymer plasticizer selected from the group consisting of arylene polysulphides and aliphatic polysulphides containing aliphatic ether chains joining the sulfur atoms therein.
11. A pigmented, rosin-free composition for use in marking roads and the like consisting essentially of, by weight, from 30 to 95 parts sulphur, from 1 to 30 parts of at least one polysulphide polymer plasticizer selected from the group consisting of arylene polysulphides and aliphatic polysulphides containing aliphatic ether chains joining the sulphur atoms therein, from 0.5 to 2 parts calcium carbonate and from 1 to 30 parts glass fibers uniformly dispersed in said sulphur and having a length not greater than 0.50 inch.
12. The composition of claim 11 including glass beads having a mesh size in the range of 18 to 60.
13. A method of preparing the composition of claim 1 which comprises mixing together the components and heating the same at a temperature of at least about 170° C.
14. A method of marking a road or like surface which comprises maintaining in the molten state and at a temperature of at least about 170° C., the composition of claim 1 and spraying the same onto said surface.

References Cited by the Examiner

UNITED STATES PATENTS

| 2,997,403 | 8/1961 | Seabright | 106—193 |
| 3,099,637 | 7/1963 | Nellessen | 106—193 |
| 3,164,071 | 1/1965 | Rubenstein | 50—268 |

OTHER REFERENCES

Hancock, Ind. Eng. Chem., vol. 46, pages 2431–2435 (1954).

MORRIS LIEBMAN, *Primary Examiner.*

A. LIEBERMAN, *Examiner.*